UNITED STATES PATENT OFFICE.

CHARLES A. PRARAY, OF PROVIDENCE, RHODE ISLAND.

COMPOSITION FOR DRESSING HONES.

SPECIFICATION forming part of Letters Patent No. 471,569, dated March 29, 1892.

Application filed April 6, 1891. Serial No. 387,873. (No specimens.)

*To all whom it may concern:*

Be it known that I, CHARLES A. PRARAY, of the city and county of Providence, in the State of Rhode Island, have invented a certain new and useful Improvement in Compositions for Dressing Hones; and I declare the following to be a specification thereof.

My invention is a composition to be applied to hones or whetstones to give them an improved surface for grinding purposes; and it consists of the ingredients hereinafter mentioned. Hones are made of novaculite or other stones having a fine grain and adapted to give a keen edge to steel blades. The so-called "Turkey" stone, the "Washita" stone from the hot springs of Arkansas, and some silicious stones are admirably fitted for this use. They are all porous to a considerable degree and are commonly used with oil for a dressing, and hence are often called "oil-stones." The oil, however, in combination with the fine grit which is worn off from the surface of the stone in the grinding process, soon forms a fine pasty mass, which fills up the pores of the stone and finally causes a smooth glazed surface upon the stone, thereby making it less efficacious in sharpening the blade or implement. I use for a dressing for such hones and stones, instead of oil, a fluid composition consisting of the following ingredients, mixed in the following proportions, viz: hydrate of soda, one-quarter of a grain; alcohol, ten grains; distilled water, a quantity sufficient to make a hundred grains of the fluid in all. The action of the soda is to cleanse the stone from all oil or fatty matter which may be upon it. I have found by experiment that the surface of the stone is greatly improved by the action of the soda and its grinding qualities much increased thereby, so that the steel is more quickly ground and receives a finer edge than can be obtained in using the oil dressing for the stone or hone. The alcohol tends to preserve the solution, and is especially useful in preventing the freezing of the liquid in winter when exposed to the cold.

I claim as a novel and useful invention and desire to secure by Letters Patent—

The improved liquid dressing for hones and whetstones herein described, consisting of the hydrate of soda, alcohol, and distilled water, substantially in the proportions mentioned.

CHARLES A. PRARAY.

Witnesses:
WARREN R. PERCE.
DANIEL W. FINK.